United States Patent
Cheung et al.

(10) Patent No.: US 7,155,472 B2
(45) Date of Patent: Dec. 26, 2006

(54) FIXED-POINT QUANTIZER FOR VIDEO CODING

(75) Inventors: Ngai-Man Cheung, Los Angeles, CA (US); Ho-Cheon Wey, Ibarki (JP); Yuji Itoh, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 693 days.

(21) Appl. No.: 10/364,636

(22) Filed: Feb. 11, 2003

(65) Prior Publication Data

US 2004/0158595 A1 Aug. 12, 2004

(51) Int. Cl.
G06F 7/38 (2006.01)
(52) U.S. Cl. ...................................... 708/551
(58) Field of Classification Search ................. 708/551
See application file for complete search history.

(56) References Cited

U.S. PATENT DOCUMENTS 6,874,007 B1* 3/2005 Denk et al. ................. 708/550
2004/0086192 A1* 5/2004 Togashi et al. ............. 382/251

\* cited by examiner

*Primary Examiner*—Tan V. Mai
(74) *Attorney, Agent, or Firm*—Robert D. Marshall, Jr.; W. James Brady; Frederick J. Telecky, Jr.

(57) ABSTRACT

A quantizer employs a scaled integral inverse ratio division for quantization of an input T by a quantization step Q. The quantizer forms an integral approximation q of $2^r/Q$ by either trunc($2^r/Q$) or round($2^r/Q$). A multiplier multiplies the absolute value of T by the q. An adjustment factor is added alternatively to the absolute value of T prior to multiplication or to the product after multiplication. This adjustment factor minimizes errors near transition points in the quantization. This invention is applicable to both trunc(T/Q) and round(T/Q).

8 Claims, 3 Drawing Sheets

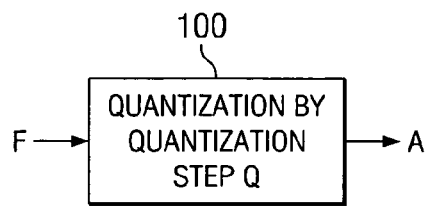
*FIG. 1*
*(PRIOR ART)*
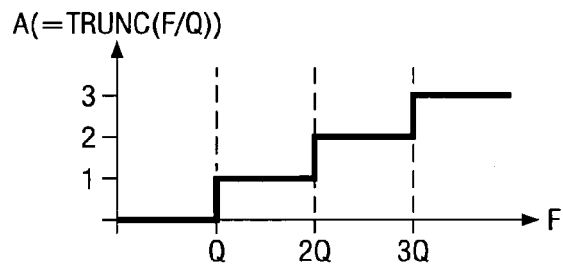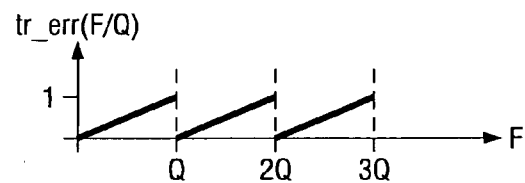
*FIG. 2a*      *FIG. 2b*
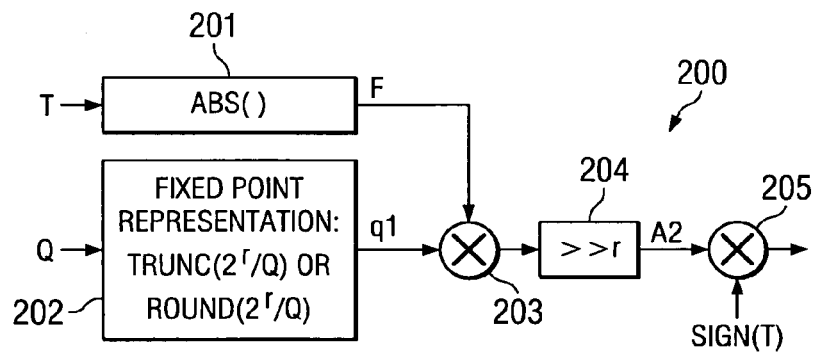
*FIG. 3*
*(PRIOR ART)*
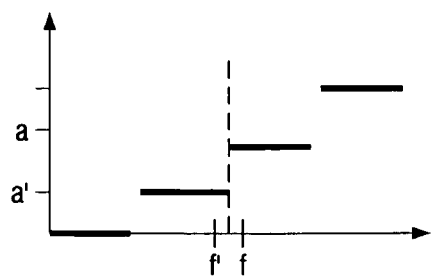
*FIG. 4*

FIXED-POINT QUANTIZER FOR VIDEO CODING

TECHNICAL FIELD OF THE INVENTION

The technical field of this invention is data quantizers particularly those used in video data coding.

BACKGROUND OF THE INVENTION

Quantization reduces the precision of input values. The lower precision outputs can be represented with fewer bits, thereby achieving data compression. Quantization is an important step in all video coding standards.

FIG. 1 illustrates the quantization process 100. Quantization divides an integer input F by an integer quantization step Q. The quotient is an integer and a fractional part. The resultant A includes rounding the fractional part by a method based on the coding standard. The rounding conventions for several standards are shown in Table 1.

TABLE 1

| Video Coding Standard | Rounding Convention |
| --- | --- |
| MPEG-1/2 Intra DCT coefficients | Round to the nearest integer |
| MPEG-1/2 Inter DCT coefficients | Round with truncation toward zero |
| H.263 (MPEG-4 type 2) Intra AC and Inter DCT coefficients | Round with truncation toward zero |

FIG. 2a illustrates the relationship between the input F, the quantization step Q and the output A using the truncation toward zero (A=trunc(F/Q)). FIG. 2b illustrates the quantization error tr_err(F/Q). The quantization error tr_err(F/Q)= F/Q−trunc(F/Q).

Division takes a lot of computation compared to addition, subtraction and multiplication. Division is more complicated than these other operations when embodied in hardware circuits. The amount of computation is important in video coding, because a lot of data must be quantized. Thus quantization is often achieved indirectly. A common method replaces division by multiplication between the numerator and the reciprocal of the denominator. Moreover, the reciprocal of denominator is not represented as a floating point number but as a fixed-point number. In fixed-point representation the decimal point is implicitly placed between bits of the binary representation of a number. The decimal point position is selected depending on the required precision and range. With fixed-point representation, all arithmetic operations use integer arithmetic. This improves computation speed and reduces complexity.

Table 2 lists definitions of some functions used in this application for reference.

TABLE 2

| Term | Definition |
| --- | --- |
| trunc(x) | Rounding with truncation toward zero |
| round(x) | Rounding to nearest integer |
| tr_err(x) | Truncation error function x − trunc (x) |
| rd_err(x) | Rounding error function x − round (x) |

The program code listing below shows a common fixed-point implementation of the truncation quantizer trunc(F/Q). This implements integer division with truncation towards zero.

```
/* Fixed-point Implementation of Quantizer trunc(T/Q)   */
/* F, q1 and a are fixed point numbers                  */
unsigned int F;       /* 0 bits after decimal point     */
unsigned int q1;      /* Fixed point representation of
                         1/Q, i.e. q1 = 1/Q, r bits
                         after decimal point            */
unsigned int a;
F = abs (T);
a = F * q1;           /* a 0+r bits after decimal point */
A2 = a >> r           /* shift a by 0+r bits, obtains
                         integer part only of quotient  */
return A2 * sign(T);
```

This code listing is valid for any integer T and positive integer Q. Table 3 shows a comparison between direct division and this fixed-point algorithm.

TABLE 3

| | Direct Division trunc(F/Q) | Fixed Point Implementation (F − q1) >> r |
| --- | --- | --- |
| CPU cycles per input | 55 | 9 |

The fixed-point implementation is considerably faster than direct division. This fixed-point implementation has been used in many products and video end-equipment. This fixed-point implementation of quantizer will be used as the baseline quantizer in this application.

SUMMARY OF THE INVENTION

The baseline quantizer can cause deviation no matter how accurate the implemention. This deviation is the difference between direct division and multiplication by the scaled integer inverse of the quantization step. The fixed-point design of this invention computes an adjustment factor for use near transition points in the quantization output. This adjustment factor can completely eliminate the deviation. The improved quantizer of this invention may require slightly more computation power or slightly more complex hardware than the prior art implementation. The quantizer of this invention improves the picture quality compared to the baseline quantizer when used for H.263 (MPEG-4 type 2) quantization.

BRIEF DESCRIPTION OF THE DRAWINGS

These and other aspects of this invention are illustrated in the drawings, in which:

FIG. 1 illustrates the quantization process according to the prior art;

FIG. 2a illustrates the relationship between the input F, the quantization step Q and the output A using truncation toward zero;

FIG. 2b illustrates the quantization error;

FIG. 3 illustrates a quantizer used to compute trunc(T/Q) according to the prior art;

FIG. 4 illustrates how a small error in an intermediate value can cause a large error in the final result;

DETAILED DESCRIPTION OF PREFERRED EMBODIMENTS

Figure 5:
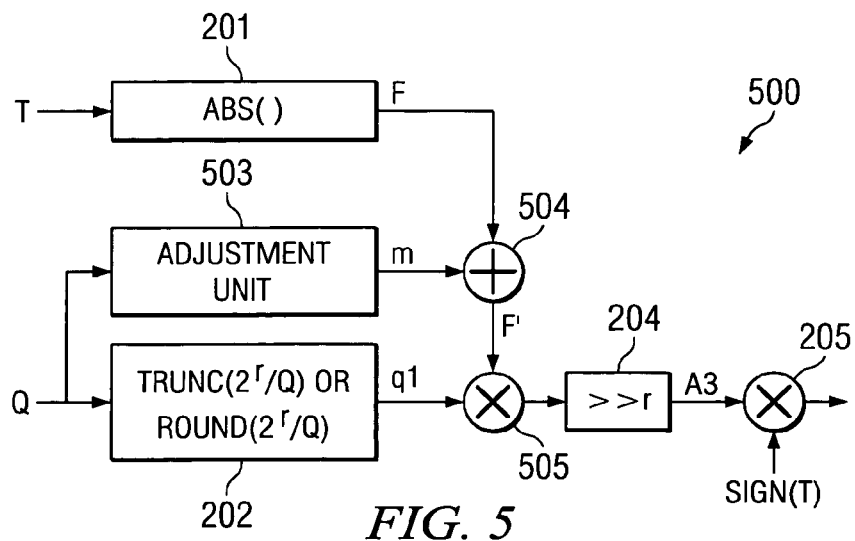
FIG. 5 illustrates an improved quantizer according to a first embodiment of this invention.

FIG. 3 illustrates a baseline quantizer 200 used to compute trunc(T/Q). This function is used in quantizing H.263 Intra AC and Inter DCT coefficients. Absolute value block 201 forms the absolute value of the input T. The result is a positive integer F. Inverting block 202 receives the quantization step Q and forms the inverse quantization step q1. This is scaled by a factor r. Thus the inverse quantization step q1 is $q1=\text{trunc}(2^r/Q)$, when truncation is used or by $q1=\text{round}(2^r/Q)$, when rounding is used. Inverter block 202 calculates the fixed-point representation of 1/Q using r+1 bits to represent q1 assuming $Q \geq 1$. Only r bits are needed if Q>1. This occurs because when Q=1, the output is always F and the quantizer merely passes through the input. Multiplier 203 forms the intermediate product a of F and q1. Scaling block 204 right shifts the product by r places forming A2. This recovers the scaling of inverting block 202. Multiplier 205 forms the product of scaled quantity A2 and the sign of the input T. The product result is the quantized input.

With F=abs(T), then A1=trunc(F/Q) is the quantization output using direct division. The purpose of quantizer 200 is to compute trunc(F/Q), but q1, the fixed-point representation of 1/Q, can be calculated by rounding or truncation. The following description investigates the error between A1 and A2 for all F and Q. Intuitively, any error should reduce for increases in r. This error cannot be completely eliminated because baseline quantizer 200 is sensitive to even tiny errors in intermediate results at certain transition points.

Let e1 be the error in inverting block 202. This is:

$$e1 = 2^r/Q - \text{trunc}(2^r/Q)$$

where: $0 \leq e1 < 1$ when using truncation, and $$e1 = 2^r/Q - \text{round}(2^r/Q)$$

where: $-0.5 \leq e1 < 0.5$ when using rounding. Absolute value block 201 introduces no error. Likewise, the integer multiplication of multiplier 203 introduces no error. Scaling block 204 may cause error. Let the error in scaling block 204 be e2. This error in scaling block 204 is the truncation error due to bits lost in the shift operation. Thus $e2 = \text{tr\_err}(a/2^r)$. The baseline quantizer 200 computation can be represented as:

$$q1 = 2^r/Q - e1$$

$$a = F*q1$$

$$A2 = a/2^r - e2 = a/2^r - \text{tr\_err}(a/2^r)$$

By substitution, we have:

$$A2 = \frac{F}{Q} - \frac{F*e1}{2^r} - \text{tr\_err}\left(\frac{a}{2^r}\right).$$

The following derivation assumes that $(\text{abs}(e1)*F)/2^r < 1$ or $F < 2^r$, and abs(e1)<1:

$$e2 = \text{tr\_err}(a/2^r)$$

$$a = F(2^r/Q - e1)$$

Substituting for a in the equation for e2:

$$e2 = \text{tr\_err}(F(2^r/Q - e1)/2^r)$$
$$= \text{tr\_err}(F/Q - F*e1/2^r)$$

If e1<0, then $$e2 = \text{tr\_err}(F/Q + -F*e1/2^r)$$

$$= \text{tr\_err}(F/Q) + -F*e1/2^r - 1$$

when $\text{tr\_err}(F/Q) + -F*e1/2^r \geq 1$, or $$= \text{tr\_err}(F/Q) + -F*e1/2^r, \text{ otherwise.}$$

Thus, if e1<1, then:

$$A2 = \text{trunc}(F/Q) - k, \text{ where}$$

$$k = 1 \text{ when } \text{tr\_err}(F/Q) \geq 1 - F \cdot e1/2^r, \text{ or}$$

$$k = 0, \text{ otherwise.}$$

Similarly, if e1>0, then $$A2 = \text{trunc}(F/Q) - k, \text{ where}$$

$$k = 1, \text{ when } \text{tr\_err}(F/Q) < e1*F/2^r$$

$$k = 0, \text{ otherwise.}$$

Determining the quantization error depends upon trunc (F/Q). According to the above equations, deviations occur when:

| | |
|---|---:|
| $e1 < 0$ and $\text{tr\_err}(F/Q) \geq 1 - (-e1 \cdot F/2^r)$, or | condition I |
| $e1 > 0$ and $\text{tr\_err}(F/Q) < e1 \cdot F/2^r$. | condition II |

The resulting deviation is ±1. To prevent condition I, r can be selected such that:

$$\text{tr\_err}(F/Q) < 1 - (-e1*F/2^r)$$

It can be shown that $\text{tr\_err}(F/Q) \leq 1 - 1/Q$. Thus to prevent condition I, r must be selected to make sure that:

$$2^r > -e1 \cdot F \cdot Q, \text{ for all } F, Q.$$

Thus the number of scaling bits r is selected equal to R, so that:

$$2^R > F\_MAX \cdot Q\_MAX/2$$

where: F_MAX and Q_MAX are the maximums of F and Q, respectively. This eliminates any error due to condition I.

To eliminate condition II, select r such that:

$$tr\_err(F/Q) \geq 2e1*F/2^r, \text{ when } e1>0.$$

This equation implies that when e1>0, tr_err(F/Q)=0 (i.e. F=NQ for some integer N>0) and F≠0, the output A2 of the baseline quantizer will not be equal to trunc(F/Q) however large is r. For example, suppose F=12, Q=6 and r=32.

$$q1 = \text{trunc}(2^r/Q) = 715827882, \text{ and}$$

$$A2 = 12 \cdot 715827882 >> 32 = 1$$

(since $12 \cdot 715827882/2^{32} = 1.999999998$).

Thus A2=trunc(F/Q)−1 as indicated above.

However, r can be selected so that the probability of deviation is minimum but never zero. If tr_err(F/Q)≠0, then tr_err(F/Q)≥1/Q. Note that Q>1 for e1≠0. If r is selected so that:

$$2^r \geq F*e1*Q, \text{ for all } F, Q,$$

then deviations occur only when F=NQ. This is the best we can achieve, and the probability of deviation is minimum.

In summary, if q1 is calculated by rounding, then e1<0.5 and selecting r equal to R such that:

$$2^R \geq F\_MAX \cdot Q\_MAX/2$$

achieves the minimum probability of deviation. Similarly, if q1 is calculated by truncation, then selecting r equal to R such that:

$$2^R \geq F\_MAX \cdot (Q\_MAX-1)$$

achieves the minimum probability of deviation.

If we pick an r satisfying the above equations, then deviations occur only when e1>0, tr_err(F/Q)=0 (i.e. F=N·Q for some N) and F≠0. In such cases the baseline output A2 is trunc(F/Q)−1.

This invention proposes an improved fixed-point implementation of quantizer. A first embodiment of this invention uses truncation to calculate q1, so e1≥0. This first embodiment selects r satisfying the above conditions. Furthermore, this first embodiment sets:

$$F' = F + m, \text{ where}$$

m=0, when e1=0, i.e. Q=$2^p$ for some integer p≥0, m=1, otherwise.

When e1=0, F'=F, then A2=trunc(F'/Q)=trunc(F/Q). When e1>0, F'=F+1, then:

$$A2 = \text{trunc}(F'/Q) - k$$
$$= \text{trunc}((F+1)/Q) - k, \text{ where}$$
$$k = 1, \text{ when } F + 1 = N*Q, \text{ and}$$
$$k = 0, \text{ when } F + 1 \neq N*Q.$$

It can be shown that:

$$A2 = F/Q + 1/Q - (tr\_err(F/Q) + 1/Q - 1) - k,$$

when $tr\_err(F/Q) + 1/Q \geq 1$, and $$A2 = F/Q + 1/Q - (tr\_err(F/Q) + 1/Q) - k,$$

otherwise.

Note that tr_err(F/Q)+1/Q≥1 is equivalent to F=NQ−1 for some N. Since k=1, the above equation becomes:

$$A2 = F/Q - tr\_err(F/Q)$$
$$= \text{trunc}(F/Q)$$

When tr_err(F/Q)+1/Q≥1 is not true, then F≠NQ−1 and hence k=0. The above equation becomes:

$$A2 = F/Q + 1/Q - (tr\_err(F/Q) + 1/Q)$$
$$= \text{trunc}(F/Q)$$

Adding an adjustment m to F, yields trunc(F/Q) for all F and Q and eliminates all deviations.

FIG. 4 illustrates how a small error in an intermediate value can cause a large error in the final result. Intermediate value f is near a transition point in the quantization function. A small change from f to f' causes a large change from a to a' in the quantization output.

FIG. 5 shows the improved quantizer 500. Absolute value block 201 forms the absolute value of the input T resulting in positive integer F. Inverting block 202 receives the quantization step Q and forms the inverse quantization step q1 scaled by a factor r. Inverting block 202 forms q1=trunc($2^r/Q$) using truncation. Adjustment unit 503 forms the above derived adjustment m responsive to the quantization step Q. As described above: m=0 when e1=0, i.e. Q=$2^p$ for some integer p≥0; and m=1 otherwise. Adder 504 adds m to F yielding F'. Multiplier 505 forms the intermediate product a of F' and q1. Scaling block 204 right shifts the product by r places forming A3. Multiplier 205 forms the product of scaled quantity A3 and the sign of the input T. The product result is the quantized input. The output A3 of quantizer 500 is always the same as trunc(F/Q) with integer division of F by Q.

The addition of adjustment m and checking to determine if Q=$2^p$ requires little overhead. For H.263 and MPEG-4 type 2 quantization such as for Intra AC or Inter coefficients, this test is required only once per macroblock so the overhead is negligible. For MPEG-1/2 and MPEG-4 type 1 quantization, Q=QP*W[i,j] for coefficient at location (i,j), where W[i,j] is the 8-by-8 quantization matrix. If W[i,j] is different at each location (i,j), then this test is required for 64 different values per macroblock when QP changes. In this case the improvement in picture quality may not justify the extra overhead. However, it is uncommon for W[i,j] to be different at each location. For example, the MPEG-1 default inter quantization matrix is W[i,j]=16 for all (i,j). So Q needs to be checked only once per macroblock and the overhead is negligible.

Figure 6:
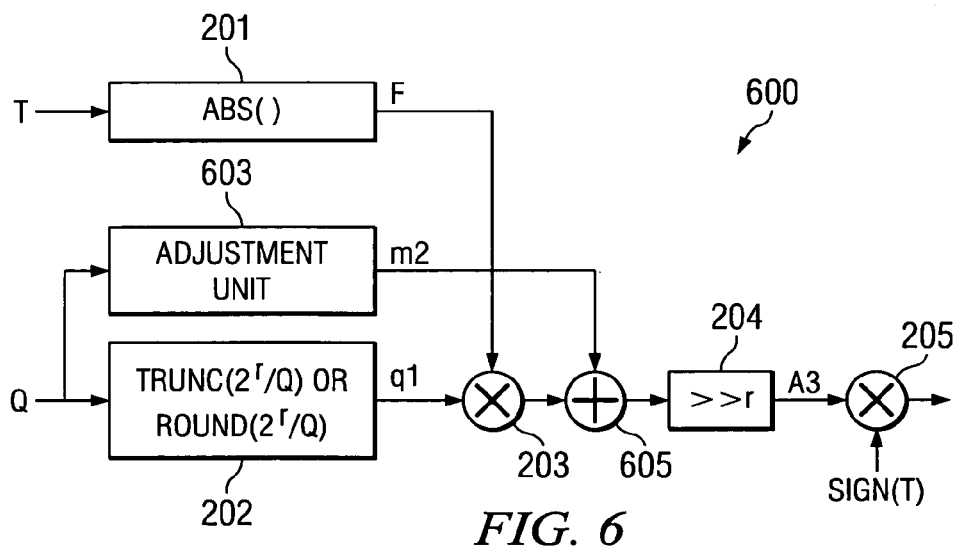
FIG. 6 illustrates an improved quantizer according to a second embodiment of this invention.

FIG. 6 shows improved quantizer 600 which is an alternative design that eliminates all the deviation. Absolute value block 201 forms the absolute value of the input T resulting in positive integer F. Inverting block 202 receives the quantization step Q and forms the inverse quantization step q1 scaled by a factor r. Inverting block 202 forms q1=trunc($2^r/Q$) using truncation. Multiplier 203 forms the intermediate product a of F and q1. Adjustment unit 603 forms the above derived adjustment m2 responsive to the quantization step Q. As described above: m2=0, when Q=$2^p$ for some integer p≥0; and m2=q1, otherwise. Adder 605 sums the intermediate product a and the adjustment m2.

Scaling block 204 right shifts the product by r places forming A3. Multiplier 205 forms the product of scaled quantity A3 and the sign of the input T. The product result is the quantized input. The design illustrated in FIG. 6 takes advantage of the single cycle multiply-add operation found in many digital signal processors. Thus this alternative embodiment requires the same computation power as the baseline design 200.

Figure 7:
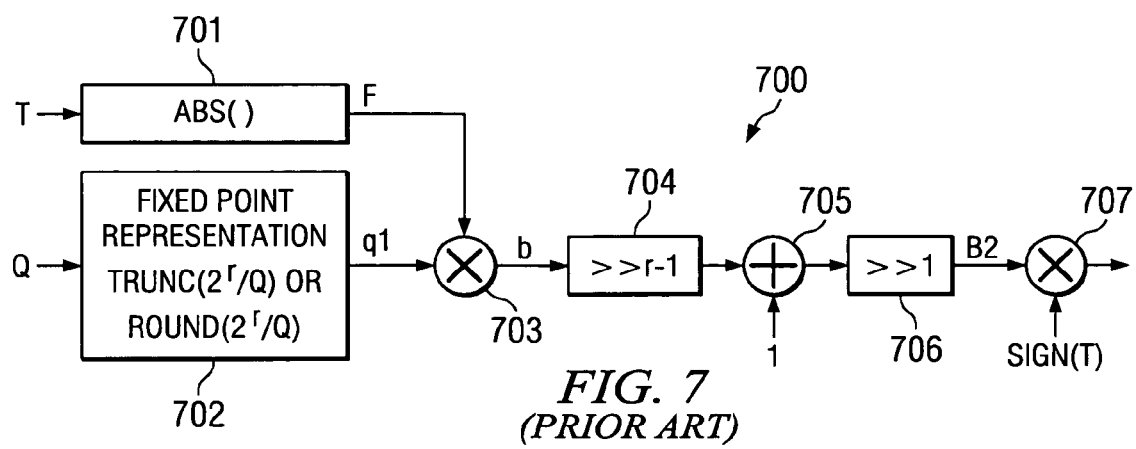
FIG. 7 illustrates a quantizer used to compute round(T/Q) according to the prior art.

The previous sections regarding FIGS. 3 to 6 concern the truncation quantizer trunc(T/Q). The counterpart rounding quantizer round(T/Q) using integer division with rounding to the nearest integer has similar issues. FIG. 7 illustrates quantizer 700, which is a common fixed-point realization of the quantizer round(T/Q). Absolute value block 701 forms the absolute value of the input T. The result is a positive integer F. Inverting block 702 receives the quantization step Q and forms the inverse quantization step q1, which is q1=trunc($2^r$/Q), if truncation is used or q1=round($2^r$/Q), if rounding is used. Multiplier 703 forms the intermediate product b of F and q1. Scaling block 704 right shifts the product by r−1 places. Adder 705 adds one to the scaled resultant from scaling block 704. Shift block 706 right shifts the sum by one bit. This completes recovery the scaling of inverting block 702. The shift by r−1 bits, add one and shift by one bit forms a rounded quantity B2 rather than a truncated quantity. Multiplier 707 forms the product of scaled quantity B2 and the sign of the input T. The product result is the quantized input.

Let:

$$B1 = \text{round}(F/Q)$$

that is, B1 is the output from the implementation using division directly. It can be shown that the output from the baseline rounding quantizer B2 is:

$$B2 = \text{round}(F/Q) + k, \text{ where:}$$

$$k = 1 \text{ when } e1 < 0, M \leq F/Q < (M+1/2), \text{ and}$$

$$tr\_err(2 \cdot F/Q) + (F/2^r)^*(-e1) \geq 1;$$

$$k = -1 \text{ when } e1 > 0, (M+1/2) \leq F/Q < M+1, \text{ and}$$

$$tr\_err(2 \cdot F/Q) - (F/2^r)^* e1 < 0; \text{ and}$$

$$k = 0 \text{ otherwise}$$

for some integer M≥0. Error e1 is due to fixed-point representation of 1/Q, i.e. e1=tr_err($2^r$/Q) or rd_err($2^r$/Q). Hence deviations occur when:

$$e1 < 0, M \leq F/Q < (M+1/2), \text{ and}$$

$$tr\_err(2 \cdot F/Q) + (F/2^r)^*(-e1) \geq 1 \text{ holds, or} \quad \text{condition I}$$

$$e1 > 0, (M+1/2) \leq F/Q < M+1, \text{ and}$$

$$tr\_err(2 \cdot F/Q) - (F/2^r)^* e1 < 0 \text{ holds.} \quad \text{conidtion II}$$

A sufficiently large r can prevent condition I. However, condition II can occur no matter how large r is. In particular, when e1>0, (M+1/2)≤F/Q<M+1 and tr_err(2·F/Q)=0, thus F/Q=(M+1/2), condition II will hold and deviation will occur for whatever r. Nevertheless, we can achieve the minimum probability of deviation by setting r=R such that:

$$2^R \geq F\_MAX * Q\_MAX$$

In this case deviations occur only when e1>0 and F/Q=(M+1/2).

An improved design can completely eliminate the deviation. Using truncation to calculate q1 and selecting r to satisfy the equation above, set:

$$F' = F + m3, \text{ where}$$

$$m3 = 0, \text{ when } e1 = 0, \text{ thus } Q = 2^p \text{ for some integer } p \geq 0, \text{ and}$$

$$m3 = 1, \text{ otherwise.}$$

This eliminates the deviation.

Figure 8:
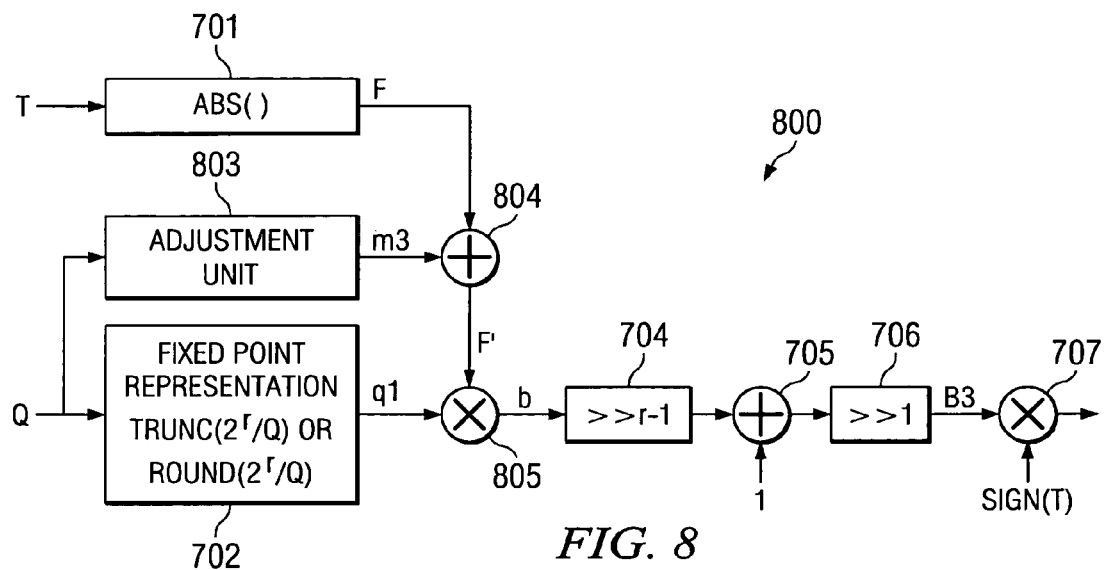
FIG. 8 illustrates an improved quantizer according to a third embodiment of this invention.

FIG. 8 illustrates the improved quantizer 800 for rounding. Absolute value block 701 forms the absolute value of the input T. The result is a positive integer F. Inverting block 702 receives the quantization step Q and forms the inverse quantization step q1, which is q1=trunc($2^r$/Q) or q1=round($2^r$/Q). Adjustment unit 803 forms the above derived adjustment m3 responsive to the quantization step Q. As described above: m3=0, when e1=0, thus Q=$2^p$ for some integer p≥0, and m3=1, otherwise. Adder 804 adds m3 to F yielding F'. Multiplier 805 forms the intermediate product b of F' and q1. Scaling block 704 right shifts the product by r−1 places. Adder 705 adds one to the scaled resultant from scaling block 704. Shift block 706 right shifts the sum by one bit. Multiplier 707 forms the product of scaled quantity B2 and the sign of the input T. The product result is the quantized input.

Figure 9:
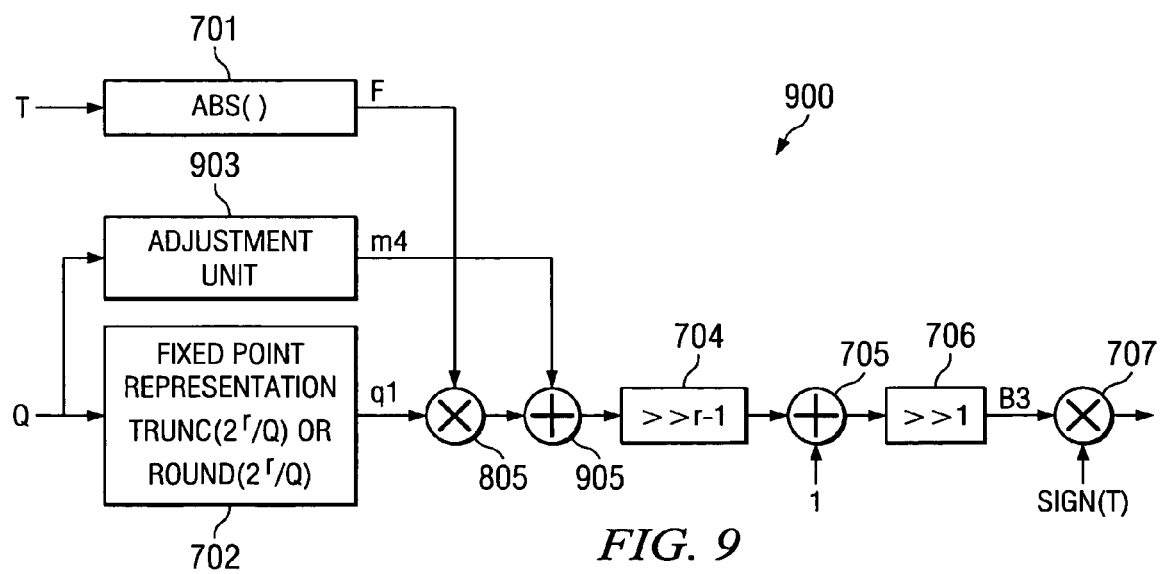
FIG. 9 illustrates an improved quantizer according to a fourth embodiment of this invention.

FIG. 9 shows the improved quantizer 900, which is an alternative design that eliminates all the deviation. Absolute value block 701 forms the absolute value of the input T resulting in positive integer F. Inverting block 702 receives the quantization step Q and forms the inverse quantization step q1 scaled by a factor r. Inverting block 702 forms q1, which is q1=trunc($2^r$/Q) or q1=round($2^r$/Q). Multiplier 805 forms the intermediate product result of F and q1. Adjustment unit 903 forms the above derived adjustment m4 responsive to the quantization step Q. As described above: m4=0, when e1=0, thus Q=$2^p$ for some integer p≥0, and m4=q1, otherwise. Adder 905 sums the intermediate product result and the adjustment m4. Scaling block 704 right shifts the product by r−1 places. Adder 705 adds one to the scaled resultant from scaling quantity B2 and the sign of the input T. The product result is the quantized input. This alternative embodiment requires the same computation power as the baseline design 700.

What is claimed is:

1. A quantizer receiving an input T and a quantization step Q and forming a quantization output A in the form trunc(T/Q), the quantizer unit comprising:
   an absolute value unit receiving the input T and forming F the absolute value of T;
   an adjustment unit receiving the the quantization step Q and forming a correction factor m equal to 0 where Q=$2^p$ for some integer p≥0 and m equal to 1 otherwise;
   an adder connected to said absolute value unit and said adjustment unit and forming F' the sum of F and m;
   an inverting unit receiving the quantization step Q and forming q an integer approximation of ($2^r$/Q), where r is a positive integer;
   a first multiplier connected to said absolute value unit and said inverting unit and forming the product of F' and q;
   a shifter receiving the product of F and q from said first product unit and forming A3 the product of F and q right shifted by r bits; and
   a second multiplier receiving the input T and connected to said shifter forming A the product of the sign of T and A3.

2. The quantizer of claim 1, wherein:
said inverting unit selects r where $2^r \geq$ F_MAX*(Q_MAX−1), where F_MAX is the maximum possible value of F and Q_MAX is the maximum possible value of Q.

3. A quantizer receiving an input T and a quantization step Q and forming a quantization output A in the form trunc(T/Q), the quantizer unit comprising:
an absolute value unit receiving the input T and forming F the absolute value of T;
an inverting unit receiving the quantization step Q and forming q an integer quantity trunc($2^r$/Q), where r is a positive integer;
a first multiplier connected to said absolute value unit and said inverting unit and forming the product of F and q;
an adjustment unit receiving and the quantization step Q and forming a correction factor m2 equal to 0 where Q=2p for some integer p≧0 and m2 equal to q otherwise;
an adder connected to said first multiplier and said adjustment unit and forming F' the sum of F and m2;
a shifter receiving the F' from said first product unit and forming A3 as F' right shifted by r bits; and
a second multiplier receiving the input T and connected to said shifter forming A the product of the sign of T and A3.

4. The quantizer of claim 3, wherein:
said inverting unit selects r where $2^r \geq$ F_MAX, where F_MAX is the maximum possible value of F and Q_MAX is the maximum possible value of Q.

5. A quantizer receiving an input T and a quantization step Q and forming a quantization output B in the form round (T/Q), the quantizer unit comprising:
an absolute value unit receiving the input T and forming F the absolute value of T;
an adjustment unit receiving the quantization step Q and forming a correction factor m3 equal to 0 where Q=2p for some integer p≧0 and m3 equal to q otherwise;
a first adder connected to said absolute value unit and said adjustment unit and forming F' the sum of F and m3;
an inverting unit receiving the quantization step Q and forming q an integer quantity trunc($2^r$/Q), where r is a positive integer;
a first multiplier connected to said absolute value unit and said inverting unit and forming the product of F' and q;
a first shifter receiving the product of F and q from said first product unit and forming A3 the product of F and q right shifted by r−1 bits;
a second adder connected to said first shifter forming the sum of 1 and the product of F and q right shifted by r−1 bits;
a second shifter connected to said second adder for right shifting the sum output of the second adder by one bit; and
a second multiplier receiving the input T and connected to said shifter forming B the product of the sign of T and B3.

6. The quantizer of claim 5, wherein:
said inverting unit selects r where $2^r \geq$ F_MAX*Q_MAX, where F_MAX is the maximum possible value of F and Q_MAX is the maximum possible value of Q.

7. A quantizer receiving an input T and a quantization step Q and forming a quantization output B in the form round (T/Q), the quantizer unit comprising:
an absolute value unit receiving the input T and forming F the absolute value of T;
an adjustment unit receiving the quantization step Q and forming a correction factor m4 equal to 0 where Q=2p for some integer p≧0 and m4 equal to q otherwise;
an inverting unit receiving the quantization step Q and forming q an integer quantity trunc($2^r$/Q), where r is a positive integer;
a first multiplier connected to said absolute value unit and said inverting unit and forming the product of F and q;
a first adder connected to said first multiplier and said adjustment unit and forming F' the sum of F and m4;
a first shifter receiving the F' from said first adder unit and forming A3 as F' right shifted by r−1 bits;
a second adder connected to said first shifter forming the sum of 1 and forming F' right shifted by r−1 bits;
a second shifter connected to said second adder for right shifting the sum output of the second adder by one bit; and
a second multiplier receiving the input T and connected to said shifter forming B the product of the sign of T and B3.

8. The quantizer of claim 7, wherein:
said inverting unit selects r where $2^r$F_MAX*Q_MAX, where F_MAX is the maximum possible value of F and Q_MAX is the maximum possible value of Q.

* * * * *